United States Patent
Breiholz et al.

(10) Patent No.: US 9,507,022 B1
(45) Date of Patent: Nov. 29, 2016

(54) WEATHER RADAR SYSTEM AND METHOD FOR ESTIMATING VERTICALLY INTEGRATED LIQUID CONTENT

(71) Applicants: Arlen E. Breiholz, Cedar Rapids, IA (US); Kevin M. Kronfeld, Cedar Rapids, IA (US)

(72) Inventors: Arlen E. Breiholz, Cedar Rapids, IA (US); Kevin M. Kronfeld, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 288 days.

(21) Appl. No.: 14/086,844

(22) Filed: Nov. 21, 2013

(51) Int. Cl.
*G01S 13/95* (2006.01)
*G01S 7/06* (2006.01)
*G01S 7/04* (2006.01)

(52) U.S. Cl.
CPC .............. *G01S 13/953* (2013.01); *G01S 7/062* (2013.01); *G01S 13/95* (2013.01); *G01S 7/04* (2013.01)

(58) Field of Classification Search
CPC ..................... G01S 7/04; G01S 13/95–13/958
USPC ........ 342/26 R, 26 A, 26 B, 26 C, 26 D, 179
See application file for complete search history.

(56) References Cited

U.S. PATENT DOCUMENTS

| | | | |
|---|---|---|---|
| 650,275 A | 5/1900 | Reeve | |
| 3,251,057 A | 5/1966 | Buehler et al. | |
| 3,359,557 A | 12/1967 | Fow et al. | |
| 3,404,396 A | 10/1968 | Buchler et al. | |
| 3,465,339 A | 9/1969 | Marner | |
| 3,491,358 A | 1/1970 | Hicks | |
| 3,508,259 A | 4/1970 | Andrews | |
| 3,540,829 A | 11/1970 | Collinson et al. | |
| 3,567,915 A | 3/1971 | Altshuler et al. | |
| 3,646,555 A | 2/1972 | Atlas | |
| 3,715,748 A | 2/1973 | Hicks | |
| 3,764,719 A | 10/1973 | Dell | |
| 3,781,530 A | 12/1973 | Britland et al. | |
| 3,781,878 A | 12/1973 | Kirkpatrick | |
| 3,803,609 A | 4/1974 | Lewis et al. | |
| 3,885,237 A | 5/1975 | Kirkpatrick | |
| 3,943,511 A | 3/1976 | Evans et al. | |
| 3,964,064 A | 6/1976 | Brandao et al. | |

(Continued)

FOREIGN PATENT DOCUMENTS

| EP | 1 329 738 B1 | 7/2003 |
|---|---|---|
| FR | 2658617 A1 | 8/1991 |

(Continued)

OTHER PUBLICATIONS

Brice Boudevillain and Hervé Andrieu, 2003: Assessment of Vertically Integrated Liquid (VIL) Water Content Radar Measurement. J. Atmos. Oceanic Technol., 20, 807-819.*

(Continued)

*Primary Examiner* — Peter Bythrow
(74) *Attorney, Agent, or Firm* — Donna P. Suchy; Daniel M. Barbieri (57) ABSTRACT

A hazard warning system includes a processing system. The processing system determines a vertically integrated liquid (VIL) parameter. The processing system receives radar reflectivity data associated with an aircraft radar antenna and determines the VIL parameter by determining a first reflectivity value at a first altitude and a second reflectivity value at a second altitude using the radar reflectivity data. The processing system determines the VIL parameter using a base storm altitude and a top storm altitude.

20 Claims, 4 Drawing Sheets

(56) References Cited

U.S. PATENT DOCUMENTS

| | | | |
|---|---|---|---|
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,937 A | 9/1986 | Batty, Jr. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A * | 12/1996 | Miller .................. G01S 13/951 |
| | | | 324/640 |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 * | 12/2003 | Wilson .................. G01S 13/951 |
| | | | 342/176 |
| 6,677,886 B1 | 1/2004 | Lok |
| 6,683,609 B1 * | 1/2004 | Baron, Sr. ............. G01W 1/10 |
| | | | 345/419 |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,205,928 B1 * | 4/2007 | Sweet .................. G01S 13/953 |
| | | | 342/118 |

(56) References Cited

U.S. PATENT DOCUMENTS

| | | |
|---|---|---|
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1* | 12/2007 | Kronfeld ............... G01S 13/953 342/118 |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1* | 2/2009 | Kronfeld ............... G01S 13/953 342/26 B |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1* | 4/2009 | Woodell ............... G01S 7/003 342/175 |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,921 B1 | 4/2010 | Finley et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2* | 9/2011 | Bunch ............... G01S 13/953 342/26 A |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2* | 2/2012 | Bunch ............... G01W 1/10 342/26 B |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 | 12/2012 | Bailey et al. |
| 8,902,100 B1 | 12/2014 | Woodell et al. |
| 9,019,146 B1* | 4/2015 | Finley ............... G01S 13/95 342/175 |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1* | 2/2003 | Wilson ............... G01S 13/951 342/26 D |
| 2003/0193411 A1 | 10/2003 | Price |
| 2004/0183695 A1 | 9/2004 | Ruokangas et al. |
| 2004/0239550 A1 | 12/2004 | Daly, Jr. |
| 2005/0049789 A1 | 3/2005 | Kelly et al. |
| 2005/0174350 A1 | 8/2005 | Ridenour et al. |
| 2006/0036366 A1 | 2/2006 | Kelly et al. |
| 2007/0005249 A1* | 1/2007 | Dupree ............... G01S 13/89 702/3 |
| 2008/0158049 A1 | 7/2008 | Southard et al. |
| 2009/0177343 A1 | 7/2009 | Bunch et al. |
| 2009/0219197 A1 | 9/2009 | Bunch |
| 2010/0019938 A1* | 1/2010 | Bunch ............... G01S 13/953 340/963 |
| 2010/0042275 A1 | 2/2010 | Kirk |
| 2010/0194628 A1* | 8/2010 | Christianson ......... G01S 13/953 342/26 B |
| 2010/0201565 A1 | 8/2010 | Khatwa |
| 2010/0245164 A1* | 9/2010 | Kauffman ............... G01S 7/22 342/26 B |
| 2010/0302094 A1 | 12/2010 | Bunch et al. |
| 2011/0074624 A1 | 3/2011 | Bunch |
| 2011/0148692 A1* | 6/2011 | Christianson ......... G01S 13/953 342/26 B |
| 2011/0148694 A1* | 6/2011 | Bunch ............... G01S 13/953 342/26 B |
| 2012/0029786 A1 | 2/2012 | Calandra et al. |
| 2012/0133551 A1 | 5/2012 | Pujol et al. |
| 2012/0139778 A1* | 6/2012 | Bunch ............... G01S 13/953 342/26 B |
| 2013/0226452 A1 | 8/2013 | Watts |
| 2013/0234884 A1* | 9/2013 | Bunch ............... G01W 1/00 342/26 B |
| 2014/0176362 A1* | 6/2014 | Sneed ............... G01S 13/58 342/26 R |
| 2014/0362088 A1* | 12/2014 | Veillette ............... G01S 7/00 345/441 |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

Greene, D.R., and R.A. Clark, 1972: Vertically integrated liquid water—A new analysis tool. Mon. Wea. Rev., 100, 548-552.*

Amburn, S. A., and P. L. Wolf, 1997: VIL density as a hail indicator. Wea. Forecasting, 12, 473-478.*

U.S. Appl. No. 14/206,239, filed Mar. 12, 2014, Rockwell Collins.

Final Office Action on U.S. Appl. No. 13/246,769 Dated Sep. 16, 2014, 18 pages.

Non-Final Office Action on U.S. Appl. No. 13/717,052 Dated Sep. 9, 2014, 8 pages.

Notice of Allowance on U.S. Appl. No. 12/075,103 Dated Aug. 4, 2014, 10 pages.

Decision on Appeal for Inter Parties Reexamination Control No. 95/001,860, dated Oct. 17, 2014, 17 pages.

Final Office Action on U.S. Appl. No. 12,892,663 dated Mar. 7, 2013, 13 pages.

Final Office Action on U.S. Appl. No. 13/238,606 Dated Apr. 1, 2014, 11 pages.

Non-Final Office Action on U.S. Appl. No. 12/892,663 Dated May 29, 2013, 14 pages.

Non-Final Office Action on U.S. Appl. No. 13/238,606 Dated Jul. 8, 2014, 12 pages.

Non-Final Office Action on U.S. Appl. No. 13/238,606 Dated Sep. 23, 2013, 15 pages.

Notice of Allowance on U.S. Appl. No. 13/246,769 Dated Jan. 8, 2015, 10 pages.

Office Action for U.S. Appl. No. 12/892,663, mail date Oct. 22, 2012, 12 pages.

TOA Technology, printed from website: http://www.toasystems.com/technology.html on Dec. 29, 2010, 2 pages.

Triangulation, from Wikipedia, printed from website: http://en.wikipedia.org/wiki/Triangulation on Dec. 29, 2010, 6 pages.

U.S. Appl. No. 13/246,769, filed Sep. 27, 2011, Rockwell Collins.

Non-Final Office Action on U.S. Appl. No. 13/238,606 Dated May 27, 2015, 14 pages.

(56) References Cited

OTHER PUBLICATIONS

Non-Final Office Action on U.S. Appl. No. 14/452,235 Dated Apr. 23, 2015, 9 pages.
Non-Final Office Action on U.S. Appl. No. 14/681,901 Dated Jun. 17, 2015, 21 pages.
Non-Final Office Action on U.S. Appl. No. 13/717,052 Dated Feb. 11, 2015, 15 pages.
Non-Final Office Action on U.S. Appl. No. 13/841,893 Dated Jun. 22, 2015, 27 pages.
Non-Final Office Action on U.S. Appl. No. 13/913,100 Dated May 4, 2015, 25 pages.
Non-Final Office Action on U.S. Appl. No. 13/919,406 Dated Jul. 14, 2015, 23 pages.
Notice of Allowance on U.S. Appl. No. 13/707,438 Dated Feb. 25, 2015, 11 pages.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Kuntman, Satellite Imagery: Predicting Aviation Weather Hazards, ICAO Journal, Mar. 2000, 4 pages.
Office Action for U.S. Appl. No. 13/717,052, mail date Aug. 22, 2013, 15 pages.
Office Action on U.S. Appl. No. 12/075,103 Dated Jul. 31, 2013, 8 pages.
Office Action on U.S. Appl. No. 13/246,769 Dated Apr. 21, 2014, 18 pages.
RDR-4B Honeywell User Manual for Forward Looking Windshear Detection/Weather Radar System, Rev. 6, Jul. 2003, 106 pps.
Stormscope Lightning Detection Systems, L3 Avionics Systems, retrieved on Jul. 11, 2011, 6 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Doviak et al., Doppler Radar and Weather Observations, 1984, 298 pages. (Uploaded in two parts).
Dupree et al.,FAA Tactical Weather Forecasting in the United States National Airspace, 29 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003, 106 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000, 13 pages.
Kuntman, Airborne System to Address Leading Cause of Injuries in Non-Fatal Airline Accidents, ICAO Journal, Mar. 2000, 4 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, McGraw-Hill Book Company, New York et al., 5 pages.
Pessi et al., On the Relationship Between Lightning and Convective Rainfall Over the Central Pacific Ocean, date unknown, 9 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 14/162,035, filed Jan. 23, 2014, Kronfeld et al.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Breiholz et al.
U.S. Appl. No. 14/608,071, filed Jan. 28, 2015, Breiholz et al.
Final Office Action on U.S. Appl. No. 13/238,606 Dated Jan. 22, 2015, 6 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Non-Final Office Action on U.S. Appl. No. 13/238,606 Dated Mar. 27, 2015, 21 pages.
Non-Final Office Action on U.S. Appl. No. 14/162,035, dated Feb. 4, 2016, 9 pages.
Notice of Allowance on U.S. Appl. No. 14/681,901, dated Dec. 23, 2015, 8 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.
Non-Final Office Action on U.S. Appl. No. 14/465,753 dated Apr. 4, 2016, 12 pages.
Non-Final Office Action on U.S. Appl. No. 14/162,035 dated Jul. 11, 2016, 10 pages.
Non-Final Office Action on U.S. Appl. No. 15/137,645 dated Aug. 8, 2016, 6 pages.
Notice of Allowance on U.S. Appl. No. 14/465,753, dated Aug. 29, 2016, 8 pages.

* cited by examiner

WEATHER RADAR SYSTEM AND METHOD FOR ESTIMATING VERTICALLY INTEGRATED LIQUID CONTENT

CROSS REFERENCE TO RELATED APPLICATIONS

The present application is related to U.S. application Ser. No. 13/841,893 filed Mar. 15, 2013 incorporated herein by reference in its entirety and assigned to the assignee of the present application.

BACKGROUND

This specification relates generally to the detection of a weather hazard in the atmosphere. More particularly, this specification relates to weather hazard detection using aircraft equipment.

Hazardous weather is generally associated with weather cells or storms. Weather cells such as convective weather cells include moisture and can produce turbulence, high winds, lightning, hail, and other weather hazards. A measure of the extent of a given weather hazard to an aircraft in flight is vertically integrated liquid (VIL) content. VIL content is a parameter that indicates the estimated amount of water in a column of air extending from the ground upwards. VIL content is measured in units of kg of water per $m^2$. The Federal Meteorological Handbook volume on weather radar generally refers to VIL as "vertically integrated liquid water" and provides an algorithm that is used to display VIL values as an image. The output of the VIL algorithm can be used to produce the product that is updated once per volume scan. Federal Aviation Agency (FAA) guidelines restrict air travel in regions where the estimate of VIL content is greater than 3.5 $kg/m^2$.

Conventional estimations of the VIL content in a given location are provided by the National Weather Service (NWS). For example, the NWS can provide VIL content based upon data from the NEXRAD network of weather radar installations. For aircraft, the VIL content estimates are generally transmitted from the NWS via a radio communications link while the aircraft is in flight or provided to the flight crew while on the ground. Since the NWS VIL content estimates can be computed at a maximum frequency of 1 estimate per 4 minute interval (the maximum scan rotation rate of a NEXRAD radar installation), the data may be stale (5 to 15 minutes old) by the time it reaches a flight crew. The algorithm used by the NWS to calculate VIL content is described in a paper by Douglas R. Greene of NOAA and Robert A. Clark of Texas A&M University entitled, "Vertically Integrated Liquid Water—A New Analysis Tool," (*Monthly Weather Review*, Vol. 100, No. 7, pp. 548 ff. 1972). The formula derived for calculating VIL content using a continuous sampling of reflectivity from the base of a storm to the top of the storm is:

$$M^* = \int_{h_{base}}^{h_{top}} M dh' = 3.44 \times 10^{-6} \int_{h_{base}}^{h_{top}} Z^{4/7} dh'$$

where Z is the radar reflectivity;

$M^*$ is the mass of raindrops per unit area (summing all altitudes);

$h_{Top}$ is the altitude of the top of the storm;

$h_{Base}$ is the altitude of the bottom of the storm; and

M is the mass of raindrops per unit volume (x·y·dh).

Conventional systems apply a discrete version of this formula, adding the maximum reflectivity within each volume element defined around the 1-degree beams of the radar. Since the scan patterns often space the beams at more than 1-degree increments vertically, extrapolation of the reflectivity value across a greater vertical range is often required.

Conventional aircraft hazard weather radar systems, such as the WXR 2100 MultiScan™ radar system manufactured by Rockwell Collins, Inc., have Doppler capabilities and are capable of detecting at least four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta. Such weather radar systems can conduct vertical sweeps and obtain reflectivity parameters at various altitudes.

Due to constraints on antenna size, the airborne weather radar often has a broader beam than the NEXRAD installations. The airborne weather radar system also favors update speed over scan completeness, so only two elevations are sampled in certain multi-scanning modes. In certain conventional systems, the elevations are nominally targeted at the freezing level and the higher −40° C. level of the atmosphere as returns at these levels are strong indicators of storm severity. Heretofore, airborne weather radar systems have not calculated VIL content from weather radar returns received by airborne weather radars.

Thus, there is a need for an aircraft hazard warning system method that provides VIL content detection. There is also a need for a hazard detection system that uses on-board aircraft detected VIL content parameters. There is also a need for a VIL content detection system and method that does not require a NEXRAD system. Further still, there is a need for a VIL content detection system that does not add significant cost or weight to an aircraft weather radar system. Yet further, there is a need for an aircraft hazard warning system having a radar scan optimized to determine the VIL content from a small number of reflectivity samples. Further, there is a need for a system and method of more timely and more accurate detection of VIL content parameters.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a hazard warning system. The hazard warning system includes a processing system. The processing system determines a vertically integrated liquid (VIL) parameter. The processing system receives radar reflectivity data associated with an aircraft radar antenna and determines the VIL parameter by determining a first reflectivity value at a first altitude and a second reflectivity value at a second altitude using the radar reflectivity data. The processing system determines the VIL parameter using a base storm altitude and a top storm altitude.

Another exemplary embodiment relates to a method of determining a vertically integrated liquid (VIL) parameter on an aircraft using an electronic processor. The method includes receiving radar reflectivity data and temperature data and determining a first reflectivity value at a first altitude and a second reflectivity value at a second altitude using the electronic processor. The method also includes providing the VIL parameter at least in part in response to the first reflectivity value and the second reflectivity value.

Another exemplary embodiment relates to an aircraft radar system including a radar antenna. The radar antenna receives radar returns. The aircraft radar system also includes means for determining a VIL parameter in response to reflectivity values at least two altitudes associated with the radar returns.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION OF THE EXEMPLARY EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
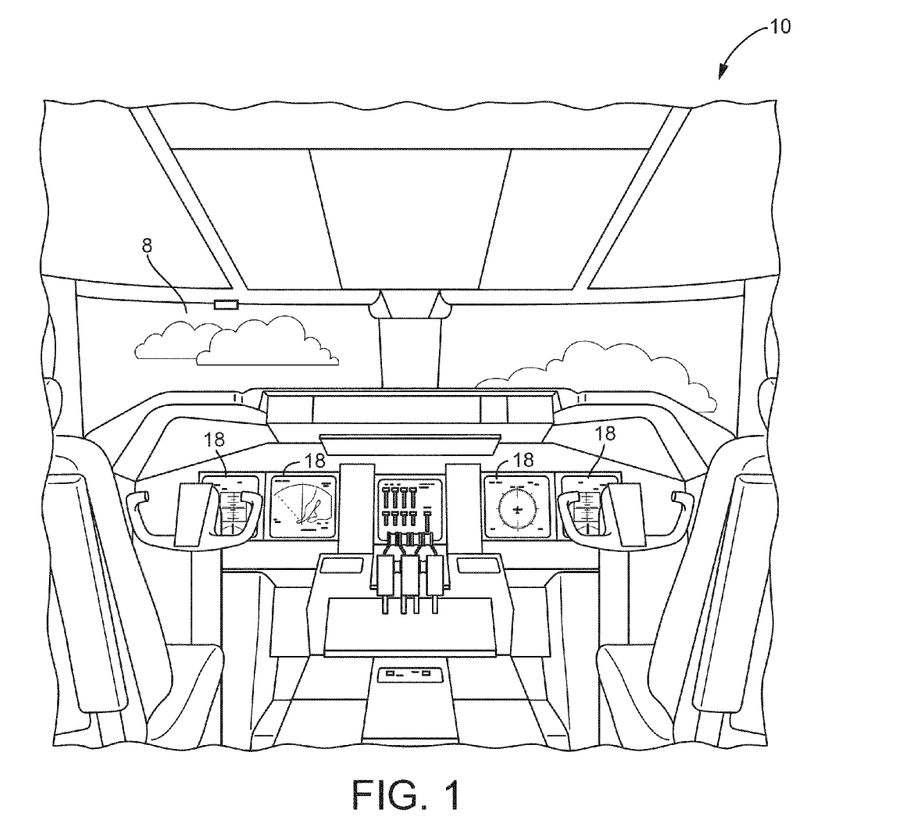
FIG. 1 is a perspective view schematic illustration of a flight deck for an aircraft including an airborne system for detecting vertically integrated liquid (VIL) content according to one embodiment.
Figure 2:
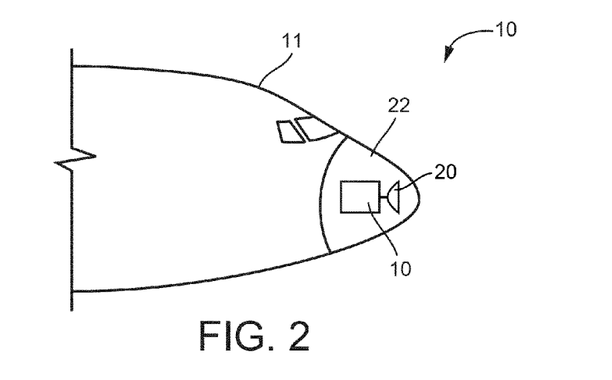
FIG. 2 is a partial side view schematic illustration of the aircraft illustrated in FIG. 1 in accordance with an exemplary embodiment.

With reference to FIGS. 1 and 2, an aircraft hazard warning system 10 or other avionic system can be configured to determine a VIL content parameter and provide a warning in response to the VIL content parameter in one embodiment. An indication of the warning can be provided on one or more of displays 18 in an aircraft 11. Alternatively, aircraft hazard warning system 10 can use the VIL content parameter in various inferential hazard detection algorithms, such as algorithms for lightning detection, convective cell detection, turbulence detection, hail detection, ice detection, etc. Hazard warning system 10 (e.g., an aircraft weather radar system or system in communication with a weather radar system) can provide a warning when the VIL content parameter is equal to or greater than 3.5 kg/$M^2$ in another embodiment. The VIL content parameter can be associated with weather 8 such as a storm, a cell, etc. System 10 can advantageously use a stored weather model to determine reflectivity values for its calculation of the VIL parameter.

The current regulatory environment as defined by governmental regulatory agencies supports display of basic radar sensor information as red, yellow, and green for radar reflectivity calibrated to rainfall rate and magenta as turbulence. However, reflectivity measurements do not necessarily show the severity of weather. Applicants believe that the VIL content parameter may be a better indicator of a potential threat of a weather system (e.g., a cell, storm, etc.). Advantageously, weather system 10 detects VIL content using data available at the flight deck in one embodiment. An indication that does not interfere with the current regulatory environment, such as a speckled region (e.g., red, yellow, etc.), can be displayed as a VIL warning or hazard area on one or more of displays 18 in one embodiment.

The regulatory agencies do not currently provide guidance for changing the definition of the radar display based on VIL content hazards, although there is an FAA precedent for replacing reflectivity-based hazard colors with VIL-based colors. For example, the Corridor Integrated Weather System maps reflectivity and VIL to a common hazard scale. See, Robinson, M., Evans, J. E., Crowe, B. A., "En Route Weather Depiction Benefits of the NEXRAD Vertically Integrated Liquid Water Product Utilized by the Corridor Integrated Weather System," 10th Conference on Aviation, Range, and Aerospace Meteorology (ARAM), Portland, Oreg., Amer. Meteor. Soc., 2002. The radar display format may be selected to display radar colors consistent with or complementary to turbulence and rainfall rate as currently defined by regulatory authorities or as defined in the future by such authorities in one embodiment. A hazard assessment indication based on VIL content parameters can be provided in a manner that does not interfere with display of standard weather data in one embodiment.

Figure 3:
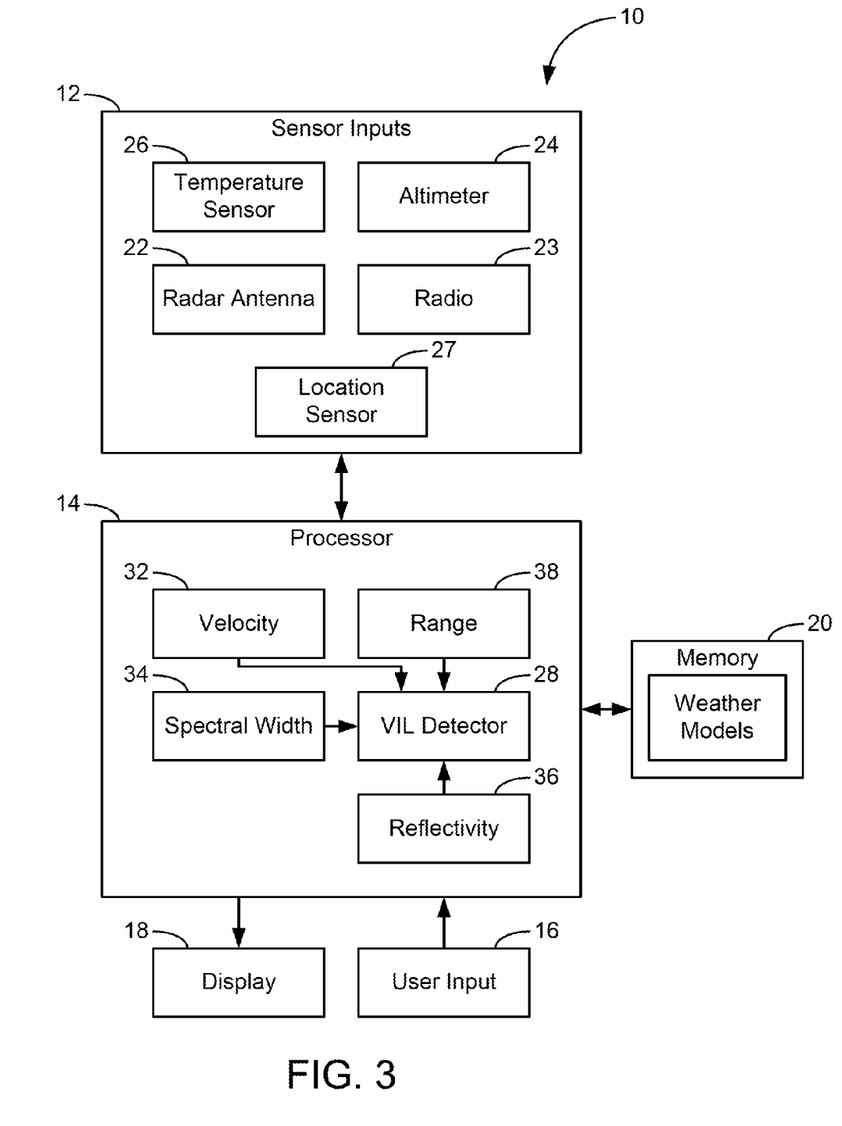
FIG. 3 is a block diagram of the airborne system for detecting VIL content of FIG. 1 according to an exemplary embodiment.

Referring to FIG. 3, aircraft hazard warning system 10 includes sensor inputs 12, a processor 14, a user input 16, a display 18, and a memory 20. System 10 can be part of an airborne weather radar system or be in communication with such a system. Hazard warning system 10 may acquire horizontal and/or vertical reflectivity profiles and detect VIL content via sensor inputs 12. Sensor inputs 12 generally include a radar antenna 22, a communications unit or radio 23, an altitude detector 24, a temperature sensor 26 and a location sensor 27. According to other exemplary embodiments, sensor inputs 12 may include any type of sensor or detector that may provide data related to direct or inferred measurement or detection of weather conditions, location and/or hazards. System 10 can include a location sensor 21 or be in communication with a location sensor or system (e.g., inertial navigation system (INS), flight navigation system, global positioning system (GPS), etc.)

Radio 23 can receive parameters or data from sources outside of the aircraft. For example, NEXRAD data can be received by radio 23 and used by processor 14 for hazard detection. In addition, VIL content, temperature (e.g., temperature at various altitudes) and altitude can be received via radio 23 from the National Weather Service (NWS) or other source. Displays 18 can be head up displays (HUDs), head down displays (HDD), primary flight displays, weather radar displays, etc.

Processor 14 is generally configured to process data received from sensor inputs 12 to determine a hazard threat level, receive input from user input 16, and provide at least one hazard indication on display 18. Processor 14 includes a VIL detector 28 in one embodiment. Processor 14 can generate a velocity parameter 32 or other Doppler data, a spectral width parameter 34, a reflectivity parameter 36, and a range parameter 38 based on return data from sensor inputs 12, data or commands from user input 16, or data or instructions from memory 20. Although Doppler data, the velocity parameter, and the spectral width parameter are mentioned above, detector 28 does not require Doppler data and spectral width data to determine the VIL parameter. Memory 20 can include a database of weather models. The weather models can include reflectivity profiles with respect to altitudes referenced to temperature for particular, times of years, times of day, locations, types of storm cells. According to various exemplary embodiments, processor 14 can be any hardware and/or software processor or processing architecture capable of executing instructions and operating on data related to hazard detection. According to various exemplary embodiments, memory 20 can be any volatile or non-volatile memory capable of storing data and/or instructions related to hazard warning system 10.

VIL detector 28 is configured to provide a VIL content parameter and/or a VIL warning in one embodiment. In one embodiment, VIL detector 28 uses vertical sweeps on weather cells to assess the VIL content parameter. VIL detector 28 can use the combination of reflectivity at altitudes associated with certain temperatures to determine the VIL content parameter in one embodiment. The reflectivity at altitudes associated with certain temperatures can be directly sampled via antenna 22 in one embodiment or can be derived using two or more sensed reflectivity values and a stored weather model in memory 20 in another embodiment. Processor 14 can access memory 20 and select a particular reflectivity profile in a weather model stored in memory 20 by comparing sampled reflectivity levels at altitudes sensed via antenna 22 to the reflectivity profiles associated with the weather model. The processor 14 selects reflectivity values at particular altitudes from the selected particular weather profile to calculate the VIL parameter in one embodiment.

Temperature data can be provided by temperature sensor 26, input 16, or radio 23 and can include a local atmospheric temperature, local temperature variations with time, local temperature variations with altitude, a remotely determined temperature, and/or remotely determined temperature gradients in either range or altitude. The altitude associated with such temperature can be calculated or received by system 10. In one embodiment, a temperature available from the NWS twice a day is used. Detector 28 can receive data inputs derived from one or more of spectral width parameter 34, reflectivity parameter 36, and/or range parameter 38 to assess and locate convective cells. Detector 28 can receive a convective cell location and storm top height and base height (sometimes referred to as ceiling height) determined from detection algorithms used by processor 14. For example, processor 15 can use a routine for identifying storm tops and convective cells by analyzing lightning data, reflectivity data, spectral parameters, etc. In one embodiment, storm top altitude and storm base or ceiling altitude can be received from NWS by radio 23.

Advantageously, VIL detector 28 can utilize existing sensors associated with sensor inputs 12 aboard aircraft 11 to obtain a VIL content estimate or parameter. In one embodiment, airborne radar sweeps are made in less than 10 seconds to obtain reflectivity measurements or radar return data at two or more altitudes. In one embodiment, three or more vertical samples are taken.

The reflectivity measurements are used to calculate the VIL content parameter via an equation or algorithm in one embodiment. The VIL content parameter can be estimated several times per minute if warranted by weather condition. In one embodiment, the VIL parameter can be based upon a weather model for a particular region, a particular time of year, and/or a particular time of day. The weather model can contain reflectivity levels with respect to atmospheric temperatures. Interpolation and extrapolation can be used to determine reflectivity levels at unobserved points to fill the vertical column of reflectivity levels. In one embodiment, these reflectivity values are compared to a weather model stored in memory 20. System 10 performs a best fit match to the weather models or curves to complete a reflectivity profile from the surface of the earth to an altitude. Reflectivity points between the surface of the earth and the altitude can be taken from the reflectivity model for the VIL calculation. For example, system 10 can advantageously be used in an aircraft 11 flying at 12,000 feet. A first scan provided at 12,000 feet can be performed and a second scan directed to a point at 25,000 feet can be performed. With reflectivity values at these two points, a reflectivity profile associated with the model can be chosen based upon location, time of day, time of year and the sampled reflectivity points. In one embodiment, the weather models may be associated with different types of air masses or different types of cell types in that region. For example, a model may be available for a squall line type cell or a stratus or stratiform cell in a particular region.

In one embodiment, VIL content detector 28 operates according to an algorithm. According to one embodiment, the algorithm is based upon the following values:

$A_{Freezing}$=The altitude of the freezing level;

$A_{-40}$=The altitude of the −40° C. level;

$A_{Base}$ The altitude of the storm base (potentially available from a NEXRAD system. This value may be set to the reported or estimated ceiling in the vicinity of the storm in one embodiment);

$A_{Top}$=The altitude of the storm top (potentially available from the NEXRAD system. In the absence of measured data, this value could be set to the tropopause height in one embodiment);

$R_{Freezing}$=The radar reflectivity in dBZ at the freezing level;

$R_{-40}$=The radar reflectivity in dBZ at the level −40° C. level;

$M_{Freezing}$=The rain mass per unit volume at the freezing level;

$M_{-40}$=The rain mass per unit volume at the −40° C. level; and $M^*$=The rain mass per unit area, i.e., the vertically integrated liquid water value.

The $R_{Freezing}$ and $R_{-40}$ values can be determined from the appropriate weather model (location, time of year, weather type, time of day, etc.) and reflectivity measurements via radar antenna 22 or can be sampled via radar antenna 22.

VIL detector 28 can calculate M* according to one embodiment using one of the two following equations:

$$M^* = M_{Freezing}(A_{Freezing} - A_{Base}) + \tfrac{1}{2}(M_{Freezing} + M_{-40})(A_{-40} - A_{Freezing}) + M_{-40}(A_{Top} - A_{-40}) \quad \text{Equation 1; or}$$

$$M^* = M_{Freezing}(A_{Freezing} - A_{Base}) + \sqrt{(M_{Freezing} \times M_{-40})}(A_{-40} - A_{Freezing}) + M_{-40}(A_{Top} - A_{-40})$$

If any of the four altitude values are unknown, estimations based on the location and ambient conditions can be made in one embodiment. Applying this algorithm to sample data from the Zipsor and Lutz vertical reflectivity v. altitude data (the mid-continent (MC) median curve of FIG. 3 in Zipsor et al.) results in a VIL content estimate of 0.012106. See Zipsor and Lutz, "The Vertical Profile of Radar Reflectivity of Convective Cells: A Strong Indication of Storm Intensity and Lightning Probability?" Monthly Weather Review, Vol. 122 (August 1994), pp. 1751-1759. This is comparable to the estimate of 0.011838 using all of the data in Zipsor and Lutz vertical reflectivity v. altitude data, an error of about 2.25%. Omitting the high altitude contribution results in an almost perfect match of 0.011824 (−0.12% error) in one embodiment. The Zipsor and Lutz reflectivity v. altitude data was adjusted by applying a wet adiabatic lapse rate of 5.5 degrees Celsius per kilometer to an average surface temperature of 20 degrees for this example. Applicants believe that Equation 1 is suitable for mid-continent environments in the United States.

In one embodiment, a special case can arise if $A_{Top}<A_{-40}$ (i.e., the top of the storm cell does not rise to the −40° C. altitude). In this case, if system 10 has sufficient access to radar, a new scan can be made at a lower altitude, (e.g., the −30° C. level, −20° C. level, −10° C. level, etc.) and the altitude and reflectivity values in the formula adjusted accordingly. The adjustment to Equation 1 and 2 can be made by substituting $A_{-newvalue}$ for $A_{-40}$ and $M_{-newvalue}$ M for $M_{-40}$ in one embodiment. If it is not feasible to execute a new scan, $M_{-40}$ may be set to 0 with $A_{-40}$ set to the altitude of the failed scan or to $A_{-40}$. Applicants believe that this process may underestimate the VIL content value, but this underestimation may not be significant if the storm top is at a low altitude.

The same approach associated with Equations 1 and 2 can be applied over land in tropical regions as well as temperate regions in certain embodiments. Oceanic storm systems can behave somewhat differently, with the reflectivity values dropping rapidly above the freezing level. Equation 1 can be modified with respect to the transition region. In one embodiment, the more rapid drop in reflectivity with altitude is accommodated by using equation 2 above. The arithmetic mean of $M_{Freezing}$ and $M_{-40}$ in equation 1 is replaced with geometric mean of the same two values in equation 2.

Applying this algorithm to the tropical oceanic curve of sample data from the Zipson and Lutz reflectivity v. altitude data results in an estimated VIL content of 0.002750, 7.61% lower than the 0.002976 value calculated using the actual reflectivity at each sample. Applicants believe that this amount of error may not be significant because oceanic storms are most commonly stratiform and consequently of less danger to aviation.

In the tropical oceanic curve, the case of zero reflectivity at the −40° C. level can be addressed by performing a scan at a lower level that does have measurable reflectivity. If this approach is not taken, substitution of zero for $M_{-40}$ can be used, but applicants believe that this may be unsatisfactory in certain situations as this would set both of the last two terms of equation 2 to zero. In one embodiment, $M_{-40}$ is set to a small value, 2 or 3 orders of magnitude less than $M_{Freezing}$.

The advantage of this method is that new VIL content values may be obtained in the amount of time needed to scan the area in front of aircraft 11 a small number of times (2 to 3), typically 10 to 15 seconds in one embodiment. With aircraft 11 moving at 10 nautical miles per minute, an airborne VIL content estimate computed every 10 to 30 seconds gives the flight crew the opportunity to react in a timely manner to hazards in the range of 20 to 30 nautical miles in front of the aircraft. Using the ground based NWS, VIL content estimates that are 5 to 15 minutes old, which limits the crew to knowledge of hazards that may be only a few nautical miles away by the time they receive the alert. In this way, use of the airborne VIL content estimate can enhance flight safety and reduce passenger discomfort due to air turbulence in weather hazard regions.

Figure 4:
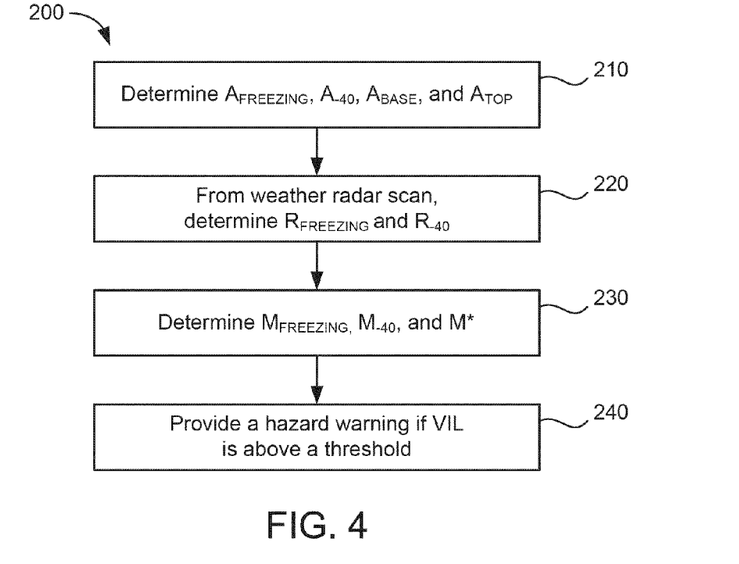
FIG. 4 is a functional flow diagram of a process executed in the airborne system of FIG. 1 for determining a VIL content parameter according to another exemplary embodiment.

With reference to FIG. 4, system 10 can utilize a method 200 to determine the VIL content parameter. A step 210, the $A_{Freezing}$ value, $A_{-40}$ value, $A_{Base}$ value and $A_{Top}$ value can be determined. The $A_{Base}$ and $A_{Top}$ values can be associated with a weather system such as a cell in the area of the aircraft. The values for $A_{Freezing}$, $A_{-40}$, $A_{Base}$ and $A_{Top}$ can be sensed, downloaded to aircraft 11 via radio 23, or input through interface 18.

Various weather radar procedures can be utilized to determine storm tops and storm bases (ceilings). Alternatively, $A_{Base}$ and $A_{Top}$ values can be provided from information sources external to aircraft 11 such as a NEXRAD system. Similarly, $A_{Freezing}$ value and $A_{-40}$ values can be determined from the weather radar system or a source external to aircraft 11. Such values can be received before or during flight.

At a step 220, detector 28 of processor 14 causes a radar scan to be performed to determine a reflectivity value $R_{Freezing}$ at an altitude of $A_{Freezing}$ and a reflectivity value at an altitude $A_{-40}$. Alternatively, the $R_{Freezing}$ value and $R_{-40}$ value can be determined from a weather model using two reflectivity values at two vertical locations along an azimuth scan. Alternatively, processor 14 can use data from scans already performed and use that data to determine the $R_{Freezing}$ and $R_{-40}$ values at a step 240 in one embodiment. In one embodiment, processor 14 uses a weather radar hazard scan that includes an azimuth scan at a tilt angle associated with $A_{Freezing}$ and a tilt angle associated with $A_{-40}$.

At a step 230, processor 14 determines an MFreezing value, an M−40 value, and an M* value (the VIL content parameter) from the MFreezing value, the M−40 value (e.g., using Equations 1 or 2 in one embodiment). In one embodiment, the M−40 value and MFreezing value are determined using the following equation.

$$M_{Freezing}=3.44\times10^{-6}(10^{R_{Freezing}/10})^{4/7} \qquad \text{Equation 3}$$

$$M_{-40}=3.44\times10^{-6}(10^{R_{-40}/10})^{4/7} \qquad \text{Equation 4}$$

At a step 240, a hazard warning can be provided on display 18 if the VIL content parameter is above a threshold. Alternatively, processor 14 can use a VIL content value in various other detection algorithms utilized by system 10.

Figure 5:
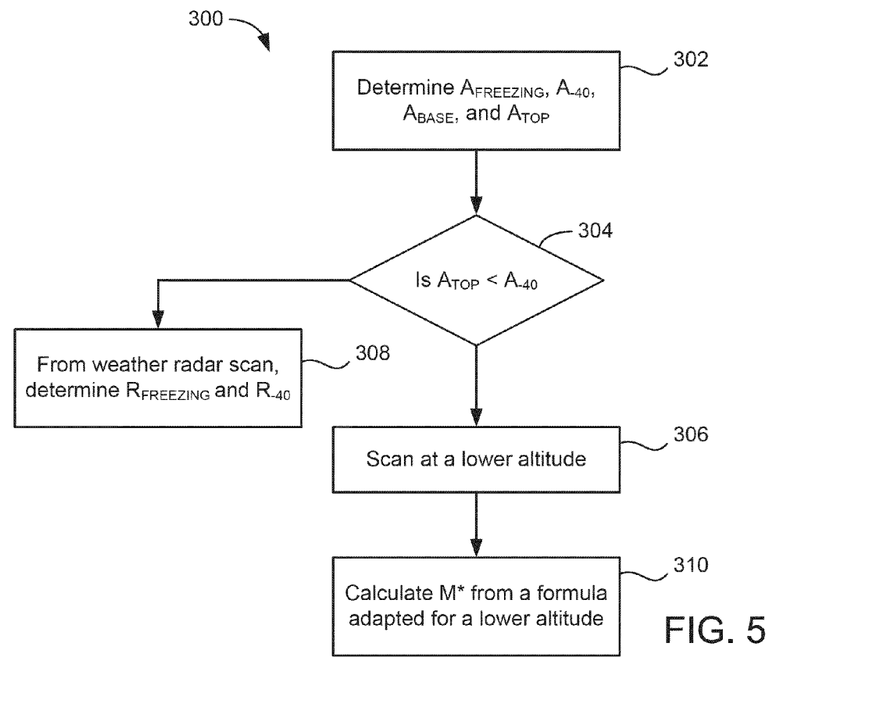
FIG. 5 is a functional flow diagram of a process executed in the airborne system of FIG. 1 for determining a VIL content parameter according to a further exemplary embodiment.

With reference to FIG. 5, detector 28 can perform a method 300 similar to method 200 discussed above. At a step 302, detector 28 can determine the $A_{Freezing}$ value, $A_{-40}$ value, $A_{Base}$ value, and $A_{Top}$ value. At a step 304, detector 28 can determine if the $A_{Top}$ value is less than (or less than or equal to) the $A_{-40}$ value. If so, processor 14 advances to step 306 where radar scans are performed at a lower altitude than the $A_{-40}$ value. If not, method 300 follows a procedure similar to method 200 at step 220 and calculates the VIL content parameter at steps 230 and 240 (FIG. 4). At a step 310, the M* value (the VIL content parameter) is calculated using an adapted equation for lower altitude weather system. In one embodiment, a lower altitude reflectivity value is chosen from data available in system 10.

Figure 6:
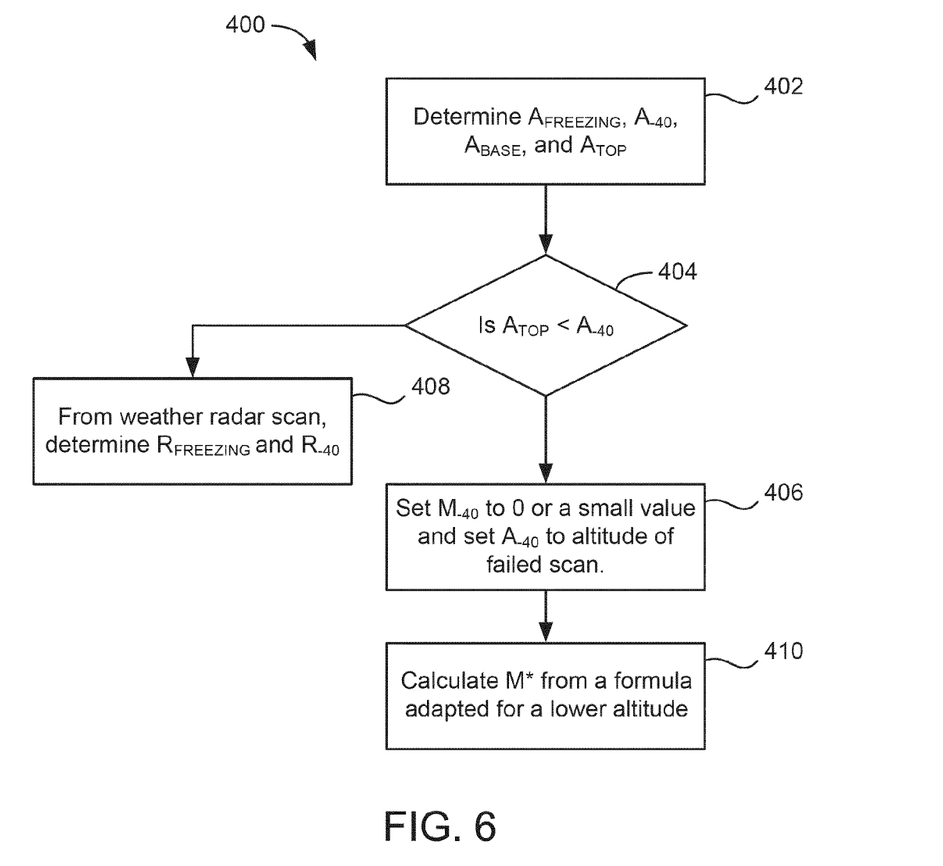
FIG. 6 is a functional flow diagram of a process executed in the airborne system of FIG. 1 for determining a VIL content parameter according to still another exemplary embodiment.

With reference to FIG. 6, a process 400 is similar to process 300. However, at a step 406, the $M_{-40}$ value is set to 0 or a small number and the $A_{-40}$ value is set to the altitude of a failed scan.

With reference to FIG. 3, processor 14 can detect one more convective cell by any technique. In one embodiment, convective cells can be identified and located using weather radar data. For example, processor 14 can detect the presence of reflectivity at a certain range (e.g., 100, 80, 40 nautical miles) and perform a vertical sweep to determine a level of conductivity in accordance with the algorithms. In one embodiment, detector 28 can use vertical structure analysis. In one embodiment, the size and location of the convective cell is obtained.

In some embodiments, system 10 (e.g., the radar or avionics equipment) may receive uplink or off-aircraft information regarding detected and/or forecast regions with VIL potential. System 10 may be used to qualify or confirm the assessment by adjusting radar parameters when scanning the detected regions (e.g., gain, etc.), increasing the dwell time in those regions, performing additional scans in those regions, etc. For example, an additional vertical sweep or sweeps can be performed in a limited region to get more accurate VIL information in the limited region. In another example, an additional horizontal sweep or sweeps can be performed in a limited region to improve interpolation. The off-aircraft assessment may be used to increase the confidence in the VIL assessment and be used to display a VIL hazard warning in that region. In some embodiments, the uplink or remote information (e.g., from ground, other aircraft, satellite, etc.) may include an observation or forecast of one or more of weather information of interest, including icing potential, convective level, size, maturity, reflectivity, winds, temperature, etc. The VIL threat assessment and information originating on aircraft 11 for the VIL assessment may also be down linked or sent to a ground station or off-aircraft system, so that the off-aircraft system can aggregate multiple aircraft observations for the development of a global VIL map or global VIL forecast that can then be uplinked to other aircraft in the vicinity or using the airspace in the future.

Processor 14 can store historical trends of the VIL parameter in one embodiment. Processor 14 can provide a predictive VIL parameter based upon the historical trends in one embodiment. Processor 14 can track a rate of change over time and use a linear prediction of the VIL parameter based upon time, the rate of change and a historical value in one embodiment. Processor 14 can provide an inferred threat based upon the predictive VIL parameter and display such a predictive threat. The predictive threat can be determined when the predictive VIL parameter is above a threshold. In one embodiment, at least some of the values for the historical trends of the VIL parameter can be provided by off aircraft sources, such as, the NWS or other aircraft.

According to various exemplary embodiments, methods 200, 300 and 400 of FIGS. 2-4 may be embodied as hardware and/or software. In exemplary embodiments where the processes are embodied as software, the processes may be executed as computer code on any processing or hardware architecture (e.g., a computing platform that can receive reflectivity data from a weather radar system) or in any weather radar system such as the WXR-2100 system available from Rockwell Collins, Inc. or an RDR-400 system available from Honeywell, Inc. Methods 200, 300, and 400 can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft hazard warning system, comprising:
    a processing system configured to determine a vertically integrated liquid (VIL) parameter, the processing system configured to receive radar reflectivity data associated with an aircraft radar antenna, the processing system configured to determine the VIL parameter by determining a first reflectivity value at a first altitude and a second reflectivity value at a second altitude in response to the radar reflectivity data, the processing system configured to determine the VIL parameter using a base storm altitude and a top storm altitude, wherein the VIL parameter is calculated using values for the first altitude and second altitude.

2. The aircraft hazard warning system of claim 1, wherein a VIL warning is provided as a speckled region, a striped region, a bright region, a region with outlined contours, or a region with varying color saturation or brightness if the VIL parameter is above a threshold on an electronic display.

3. The aircraft warning system of claim 1, wherein the first altitude is a freezing altitude; and
wherein the second altitude is a −40° C. altitude.

4. The aircraft warning system of claim 1, wherein the first and second reflectivity values are determined from a weather model based upon at least one reflectivity sample from the radar reflectivity data.

5. The aircraft warning system of claim 1, wherein the top storm altitude is computed by using a storm top algorithm.

6. The aircraft hazard warning system of claim 1, wherein the processing system determines a predictive VIL parameter based upon historical VIL parameter data.

7. The aircraft hazard warning system of claim 1, wherein the base storm altitude is estimated or wherein the base storm altitude is received from an off-aircraft source.

8. The aircraft hazard warning system of claim 1, wherein the VIL parameter is compared to a received VIL value from an off-aircraft source.

9. The aircraft hazard warning system of claim 1, wherein the VIL parameter is provided to a ground station or other aircraft.

10. An aircraft hazard warning system, comprising:
a processing system for determining a vertically integrated liquid (VIL) parameter, the processing system receiving radar reflectivity data associated with an aircraft radar antenna, the processing system determining the VIL parameter by determining a first reflectivity value at a first altitude and a second reflectivity value at a second altitude in response to the radar reflectivity data, the processing determining the VIL parameter using a base storm altitude and a top storm altitude, wherein the VIL parameter is calculated using the altitude and second altitude, wherein the processing system uses at least one of the following equations:

$$M^* = M_{Freezing}(A_{Freezing} - A_{Base}) + (A_{-40} - A_{Freezing}) \sqrt{(M_{Freezing} \times M_{-40})} + M_{-40}(A_{Top} - A_{-40}), \text{ or}$$

$$M^* = M_{Freezing}(A_{Freezing} - A_{Base}) + \tfrac{1}{2}(M_{Freezing} + M_{-40})(A_{-40} - A_{Freezing}) + M_{-40}(A_{Top} - A_{-40})$$

where:
$A_{Freezing}$=altitude of a freezing level;
$A_{-40}$=altitude of a −40° C. level;
$A_{Base}$=the base storm altitude;
$A_{Top}$=the top storm altitude;
$M_{Freezing}$=rain mass per unit volume at the freezing level;
$M_{-40}$=rain mass per unit volume at the −40° C. level; and
$M^*$=the VIL parameter.

11. The aircraft hazard warning system of claim 10, wherein the processing system uses the following equations:

$$M_{Freezing} = 3.44 \times 10^{-6} (10^{R_{Freezing}/10})^{4/7}$$

$$M_{-40} = 3.44 \times 10^{-6} (10^{R_{-40}/10})^{4/7}$$

where:
$R_{Freezing}$=radar reflectivity in dBZ at the freezing level; and
$R_{-40}$=radar reflectivity in dBZ at the level −40° C. level.

12. The aircraft hazard warning system of claim 1, wherein the processing system uses a different equation for the VIL parameter for tropical/continental, and tropical/oceanic, and mid-continent environments.

13. The aircraft hazard warning system of claim 1, wherein the processing system is configured to determine the VIL parameter as frequently as a radar system associated with the radar antenna can scan.

14. The aircraft hazard warning system of claim 1, wherein the VIL parameter is used in inferential weather detection.

15. The aircraft hazard warning system of claim 1, wherein the processing system is configured to determine the VIL parameter by using the first and second reflectivity values at two elevation angles.

16. A method of determining a vertically integrated liquid (VIL) parameter on an aircraft using an electronic processor, the method comprising:
receiving radar reflectivity data and temperature data and determining a first reflectivity value at a first altitude and a second reflectivity value at a second altitude using the electronic processor; and
providing the VIL parameter at least in part in response to the first reflectivity value and the second reflectivity value, wherein the VIL parameter is provided in response to a mathematical operation using a value of the first altitude and a value of a third altitude of a storm top or a storm base.

17. The method of claim 16, wherein the first altitude is a freezing altitude and the second altitude is a −40° C. altitude.

18. The method of claim 16, further comprising performing additional vertical sweeps to obtain more accurate VIL parameters in a limited region or performing additional horizontal sweeps to improve interpolation.

19. The method of claim 16, further comprising determining if the third altitude is lower than a −40° C. altitude, and if so, making the second altitude at a lower altitude from the −40° C. altitude, and if not, using the −40° altitude as the second altitude, wherein the third altitude is an altitude of the storm top.

20. An aircraft weather radar system, comprising:
a radar antenna for receiving radar returns; and
means for determining a VIL parameter in response to reflectivity values at least two altitudes associated with the radar returns, wherein the means for determining the VIL parameter uses at least four altitudes values to calculate the VIL parameter, the at least four altitude values comprising a storm top value, a storm base value, a value of one of the two altitudes and a value of the other of the two altitudes.

* * * * *